United States Patent [19]

Wagner

[11] Patent Number: 4,854,407
[45] Date of Patent: Aug. 8, 1989

[54] SYSTEM FOR MEASURING AIR PRESSURE ON DRIVE AXLES OF ROAD TRACTOR TRAILERS AND LOAD DISTRIBUTION

[76] Inventor: William C. Wagner, 2622A Lafayette, St. Louis, Mo. 63104

[21] Appl. No.: 238,765

[22] Filed: Aug. 30, 1988

[51] Int. Cl.$^4$ .................... G01G 19/10; B62D 53/00
[52] U.S. Cl. ...................................... 177/141; 177/1; 280/407
[58] Field of Search ................. 177/136–138, 177/141; 280/407

[56] References Cited

U.S. PATENT DOCUMENTS

| | | | |
|---|---|---|---|
| 4,103,752 | 8/1978 | Schmidt | 177/141 |
| 4,429,892 | 2/1984 | Frampton et al. | 280/407 |
| 4,505,344 | 3/1985 | Hobbs et al. | 177/136 |
| 4,649,369 | 3/1987 | Walker et al. | 280/407 X |

Primary Examiner—George H. Miller, Jr.
Attorney, Agent, or Firm—Robbins & Robbins

[57] ABSTRACT

A system for measuring the load on drive axles of tractors of over the road semitrailers and for determining load distribution on the front and drive axles of the tractor and the rear axles of the trailer. A calibratable air pressure gauge, placed in the cab of the tractor or truck, senses the pressure exerted by the trailer load on conventional air bags used to cushion the load on the drive axles. Approximate weight load may be determined by reading the pressure gauge. The gauge may be variably calibrated to accommodate the progression of settings for the fifth wheel assembly placement on an adjustment rack. Besides use on semitrailers, the system may be employed on straight or box trucks and trailers provided with air bags to cushion the axle load.

16 Claims, 2 Drawing Sheets

SYSTEM FOR MEASURING AIR PRESSURE ON DRIVE AXLES OF ROAD TRACTOR TRAILERS AND LOAD DISTRIBUTION

BACKGROUND OF THE INVENTION

In the industry of over-the-road trucking, particularly in the employment of a semitrailer, also known as a semi-tractor trailer, comprising a tractor and a trailer, there has long existed the problem of meeting the weight specifications of the vehicle and its load required by highway authorities. A maximum load weight is set for the entire rig and also separate maximum weight limits are set for each axle. Therefore, care must be taken, not always observed, to ensure that the load is evenly placed within the trailer so as not to exceed the weight limit over any one axle.

In many situations, the driver may pick up a trailer on his rig without having knowledge of the weight of the load or how it is distributed in the trailer. In those instances, the driver must have access to a scale and weigh not only the total load, but also each separate axle to determine whether or not he meets the load weight specifications. For instance, a maximum permissible axle load may, for example, be 12,000 lbs. on the front axle, 34,000 lbs. on the two rear axles of the tractor and 34,000 lbs. for the two rear wheels of the trailer totalling 80,000 lbs. on an eighteen wheeler truck. A problem arises where the trailer is unevenly loaded and the major portion of the load is at the front or the rear of the trailer which would increase the weight on the two rear axles of the cab to exceed or be less than the 34,000 lbs. limit even though the total axle scale weight of the rig may be under 80,000 lbs.

The fifth wheel assembly on the tractor of the semitrailer is conventionally adjustable forwards or backwards to distribute the weight load over the axles. Similarly, the rear of the trailer is adjustable to adjust the axle back and forth to take the weight off the fifth wheel where the load is at the front or to move the axles to the rear for a heavy rear load. When the driver does not know the distribution of the load in the trailer, he must adjust the axles by trial and error. The axles must be weighed on the scales each time after an adjustment to determine the new load distribution. This presents an undesirable situation in that much time and effort are expended. There has been a long felt need in the trucking industry to develop means for readily determining the load distribution on a trailer without requiring the inefficient method of continuously driving on weight scales after each adjustment.

SUMMARY OF THE INVENTION

By means of this invention there has been provided a system for sensing load distribution of a vehicle having an air bag suspension system to cushion the load over an axle of the vehicle. While the invention may be employed on vehicles such as straight or box trucks, and trailers provided with air bags, it is especially useful with a semitrailer having a trailer exerting a load upon the fifth wheel of a semitrailer tractor. A specially calibrated pressure gauge is employed which senses the load or pressure placed by the trailer upon the fifth wheel and the drive axle.

The calibrated pressure gauge is provided with various dials to indicate the air pressure in the air bag exerted by the trailer load upon the fifth wheel, the longitudinal adjustment position of the fifth wheel over the drive axles of the tractor, load over the drive axles and load over the front axles. The pressure gauge is adapted to be connected by an air line directly to a conventional air bag of an air suspension system which is employed between the rear frame of the tractor under the fifth wheel and over the drive axles to cushion the load of the trailer which is connected to the fifth wheel in standard fashion.

The system is employed to ensure that the separate weight loads when the semitrailer is placed upon a scale are under the maximum permissible loads for the tractor front axle, the tractor rear or drive axles and the trailer axles. All of these loads are measured separately on the scale and must be under the load limits according to regulations in the particular region of travel.

The calibration of the tractor trailer is effected with a known evenly distributed trailer maximum or near maximum load upon level ground. The fifth wheel of the tractor is adjusted longitudinally to a rack position where the load on the drive axles and the front axle are within the proper maximum loading. At this point the air compressor is actuated to ensure a maximum or standard pressure in the air bag which bears the load under the fifth wheel.

When the aforementioned steps have been taken, the specially designed calibration dials are engaged. The fifth wheel rack position is moved to an in-line registration position with the air pressure gauge needle. The drive axle dial is similarly moved so that the maximum load is registered with the gauge needle and a similar adjustment is made for the front axle dial. The calibration gauge and system is thusly calibrated for a standard evenly distributed trailer load. All of this may be done by the operator in the cab where the calibration pressure gauge may be located for at-a-glance visibility.

When the trailer is unevenly loaded with a new load of maximum or near maximum weight at the front thereby placing a greater load on the fifth wheel, a greater pressure will be developed in the air bag and the air gauge needle will register a higher pressure and a higher loading will be indicated on the drive axle. Appropriate adjustment is then made on the fifth wheel adjustment rack to distribute the load forward or where required the trailer wheels may be adjusted. This adjustment is carried out with the maximum or standard air pressure in the air bag until the pressure indication on the gauge is at the proper level. Bleeding of the line by a relief valve and re-pressuring is utilized to prevent false pressure readings. A reverse procedure may be employed where there is an uneven load at the rear of the trailer.

The calibrated pressure gauge and system for sensing and equalizing load distribution is simply fitted on existing semitrailers or the like employing a fifth wheel for connection of the tractor to the trailer. The calibrated pressure gauge and air lines to the air bag may be easily installed by the operator and can be readily employed with a minimum of training for use of the system. The rugged nature and modest cost of the system lends itself to widespread use in the industry and saving of considerable time in providing proper load distribution and passing weight scale requirements for over the road travel.

For the purpose of example, there is shown in the accompanying drawing a preferred embodiment of the invention. It is to be understood that the drawing is for purpose of example only and that the invention is not limited thereto.

IN THE DRAWINGS

DESCRIPTION OF THE INVENTION

Figure 1:
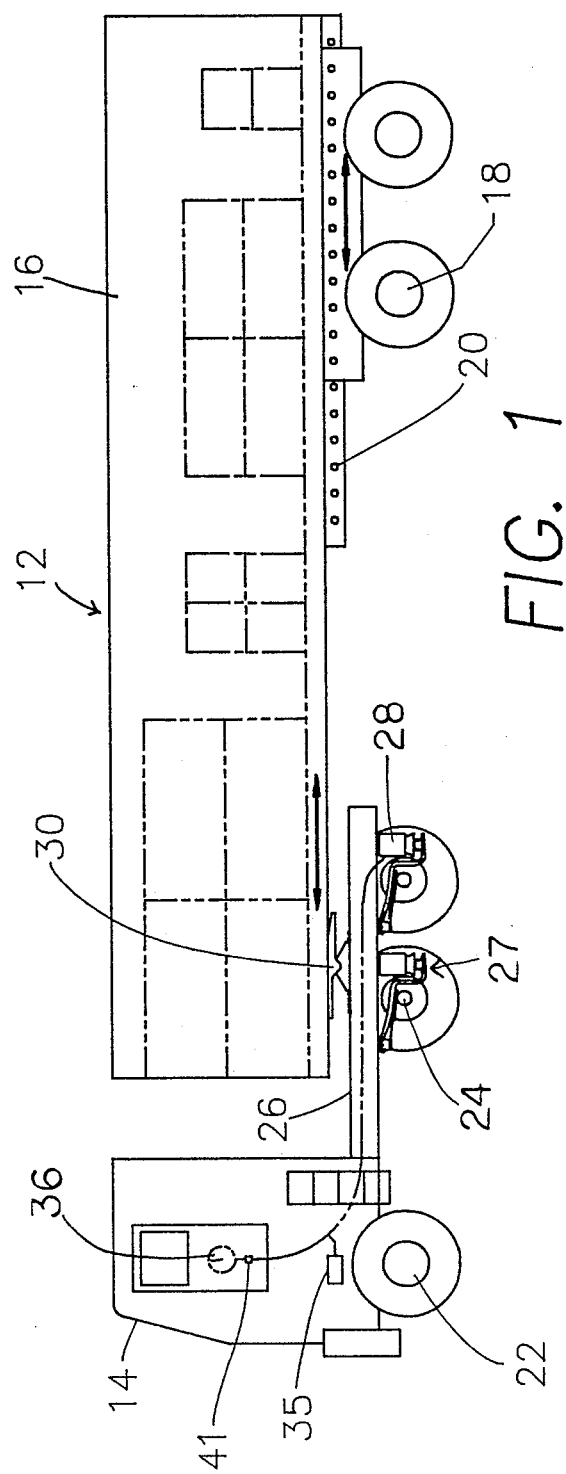
FIG. 1 is a view in side elevation showing a semitrailer with an unevenly distributed load.

The calibration air pressure gauge and system of this invention are generally indicated by the reference numeral 10 in FIG. 1. They are employed with a conventional semitrailer truck 12 comprised of a tractor 14 and a trailer 16.

Figure 4:
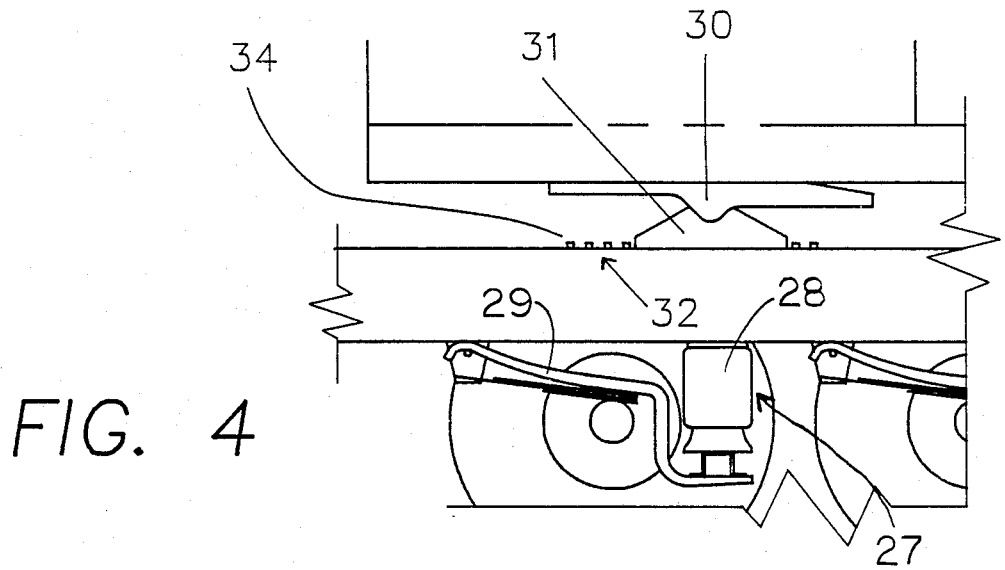
FIG. 4 is a fragmentary view in side elevation showing the fifth wheel and adjustable rack and air suspension system.

The trailer is provided with rear axles 18 and an adjustable rack 20 for shifting the trailer axles with respect to the van for load shifting as desired. The tractor has a front axle 22 and dual rear drive axles 24. A frame 26 is supported above the rear axles by an air suspension system 27 comprising an air bag or boot 28 and spring supports 29 to support the load of the front of the trailer upon a fifth wheel 30 carried by a trunnion 31 supported on the frame of the tractor. The air suspension system is conventional equipment employed over the drive axles to cushion the load of the trailer upon the rear of the tractor during operation of the semitrailer upon the highway. An adjustment rack 32, as best shown in FIG. 4, is carried by the frame and has a plurality of teeth 34 which support the fifth wheel in different longitudinal positions for varying the load distribution of the front of the trailer over the drive axles. This adjustment may be manual or hydraulic as is conventional for such tractors. All of the foregoing, in addition to the usual air compressor 35 for use with pneumatic brakes and the air suspension system, are conventional structures for semitrailers with which the calibration pressure gauge and load equalizing system of the instant invention are employed. Such air suspension systems, for example, may be Volvo White Air Spring Rear Axle Suspension, of Volvo White Truck Corporation, Kenworth, Freightliner Suspension of Freightliner Corporation and Air Beam Drive Axle Air Suspension from Neway and Lear Siegler Truck Products Corporation.

Figure 2:
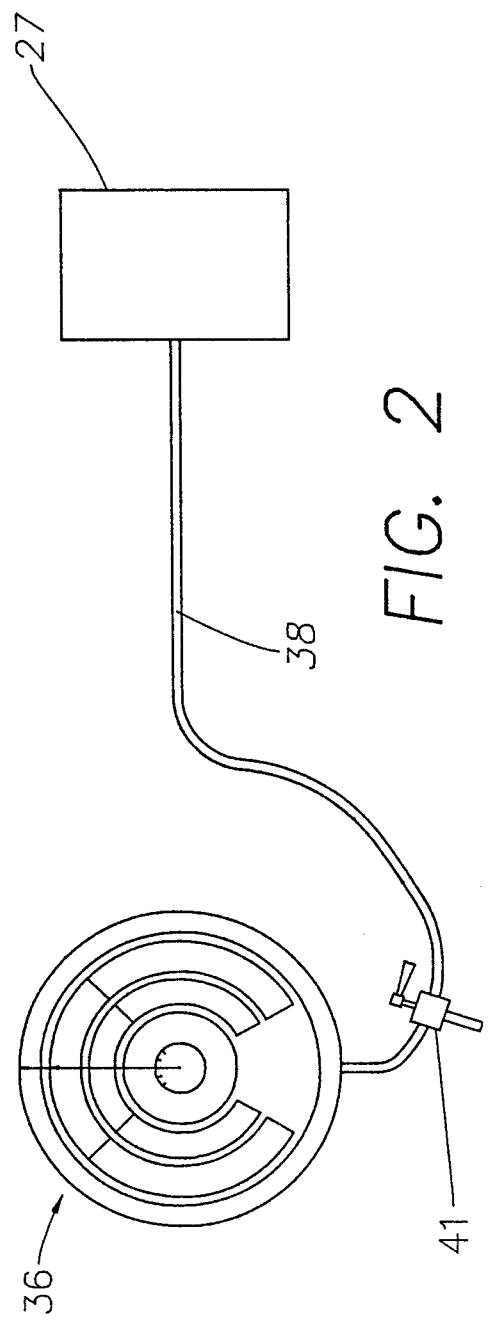
FIG. 2 is a schematic view showing the calibration scale and pressure gauge of the invention connected to an air suspension system under the fifth wheel of the trailer.
Figure 3:
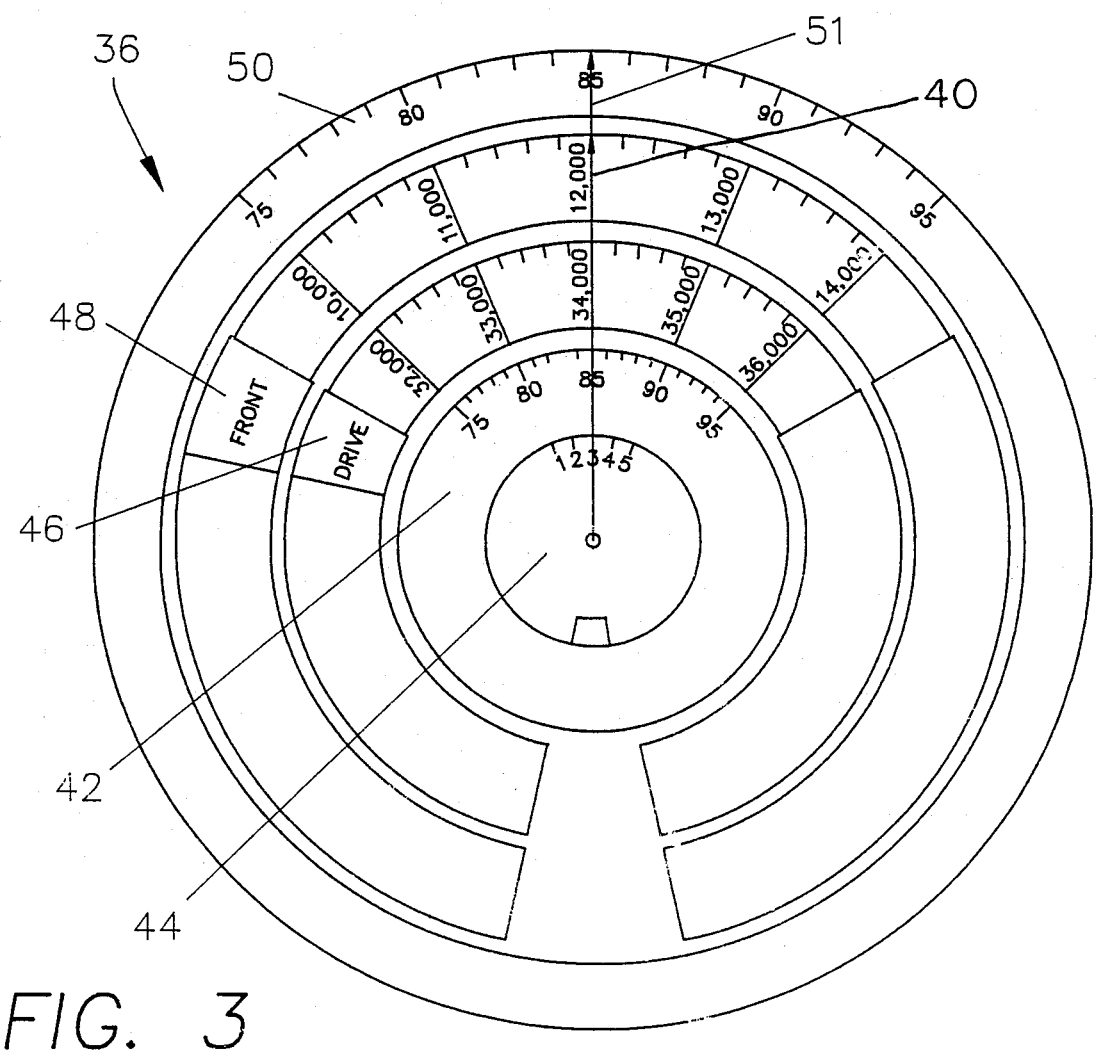
FIG. 3 is an enlarged plan view of the calibration scale employed on the face of the pressure gauge.

The calibration pressure gauge and load equalizing system of the invention comprise a specially designed calibration pressure gauge 36 which is connected by an air pressure line 38 to the air bag 28, as best shown in FIGS. 1, 2 and 3.

The calibration pressure gauge 36 is comprised of an air pressure needle 40 which senses the air pressure in the air bag and the concomitant load of the front of the trailer upon the fifth wheel 30 over the drive axles 24. A relief valve 41 is employed to bleed the air line to a low enough level to energize the standard compressor 35 in the tractor to provide a standard high calibration pressure. Each particular adjustment position of the fifth wheel upon the adjustment rack 32 will necessarily produce a different pressure and reading.

A plurality of dials are employed on the face of the calibration pressure gauge which includes a fixed air pressure dial 42. Other dials include an inner moveable dial 44 which indicates the rack position of the fifth wheel. As shown in FIG. 3 this dial may have a plurality of numbered positions such as 1 through 6 to indicate six rack tooth positions on the rack 32. It will be understood that a rack will usually have more teeth than six, which is simply an example. This dial may be moved into registry with the air pressure needle when the system is being calibrated.

A first outer concentric dial 46 is employed to indicate the load in lbs. on the fifth wheel. This dial may be graduated in thousands of lbs. on each side of a permissible maximum such as 34,000 lbs. This dial is moveably mounted on the face of the gauge in order that it may be moved into registry with the air pressure needle 40 when being calibrated.

A second outer dial 48 is further provided to indicate the load on the front axle. This dial is similarly graduated in thousands of lbs. on the high and low sides of 12,000 lbs. which is employed as a permissible maximum loading example. This dial is also moveably mounted in order that it may be moved into registry with the air pressure needle 40 when being calibrated.

A third outer dial 50 may be employed to indicate the air pressure when the system is being calibrated. This dial is graduated in lbs. per square inch, similarly to the air pressure dial. When the unit is properly calibrated, it is moved into registry with the air pressure needle 40 and the particular reading on the rack position dial in order that the operator may know that for a known rack position the calibrated standard maximum load should be a certain p.s.i. reading. A manually moveable registration needle 51 may be employed as a reminder to the operator of the proper p.s.i. reading for the particular rack position.

USE

The calibration pressure gauge and system for adjustment of load distribution on the front and drive axles of the tractor and trailer axles is readily employed in the field. In use the operator will know the maximum permissible loads for his vehicle in the area in which he is travelling and may adjust his rig for the particular load he is carrying where the trailer is not evenly loaded.

In the calibration, for purpose of example, the maximum loading established by highway regulation on the front axle may be 12,000 lbs. While the load on the drive axles may be 34,000 lbs. and the load on the trailer axles may be 34,000 lbs., totalling 80,000 lbs. The operator in his calibration will calibrate the system by adjusting the semitrailer on level ground with a known load backed up by a bill of lading to provide a total axle loading of 80,000 lbs. and usually somewhat less to provide a slight margin of error. The semitrailer is then adjusted by appropriate adjustment of the fifth wheel 30 to move it to the tooth position 34 on the rack 32 to give a load distribution of 12,000 lbs. on the front axle, 34,000 lbs. on the drive axle and 34,000 lbs. on the trailer axles. This adjustment is carried out in conventional fashion using the trailer axle adjustment 20 where required.

After this adjustment has been effected, the operator brings the compressor up to a standard high pressure such as 120 p.s.i. This may be accomplished by operation of the bleed valve 41 to reduce the air pressure and energize the compressor. The operator will then move the rack adjustment dial so that the particular tooth adjustment 34 is in registry with the air pressure needle 40. As an example, in FIG. 3 showing such calibration the dial 44 is moved to register the tooth position 3 with the air pressure needle which reads 85 p.s.i.

In order that the operator can remember the pressure at which the calibration takes place for the third rack tooth position the outer rack air pressure dial 50 is moved to register the 85 p.s.i. designation radially in line with the air pressure needle and the third tooth 3 of the rack dial 44. The registration needle 51 is also manually moved into registration as shown in FIG. 3.

The operator will then complete the calibration by moving the load designation 34,000 of the drive axle dial 46 into registry with the air pressure needle. The same procedure is carried out for the front axle dial 48 where the load designation 12,000 is moved into registry with the air pressure needle. The system is now properly calibrated and ready for use for the operator to pick up other loads which may be within maximum load requirements but unevenly distributed in the trailer.

An unevenly distributed load is shown for purpose of example in FIG. 1 where the bulk of the load is at the front of the trailer 16. The operator, after receiving the load and noting for example from the bill of lading that he has a load within maximum limits, will operate the system of this invention. This is accomplished by starting the compressor to bring it up to the standard high level such as 120 p.s.i. and then noting the p.s.i. reading of needle 40 on the calibration gauge.

For an uneven load, where the greater weight is at the front of the trailer, the heavier load on the fifth wheel should result in a higher air pressure exerted on the air bag and a higher pressure in the calibration gauge such as 86 p.s.i. as compared to the 85 p.s.i. reading when the system and semitrailer are properly calibrated as described above in connecton with FIG. 3. As an example, for the uneven load of FIG. 1 the loading on the fifth wheel and drive axle may be 36,000 lbs. while the load on the front axle may be 10,000 lbs.

The operator, after noting the p.s.i. reading on the air pressure dial 42, may even out the loading on the front and drive axles by moving the fifth wheel forward in adjustment on the rack, such as for example to tooth position 2 to increase the load on the front axle and reduce the load on the drive axle. With this forward adjustment, for purpose of example, it will be assumed the loading over the drive axles is reduced and the air pressure is reduced to 85 p.s.i. which is an indication of an evenly distributed load. If need be the operator may move the trailer axles 18 forward on the adjustment rack 20 to adjust the loading. It will be understood that the greater the number of teeth on the rack provides a greater variance and adjustment may be made on the fifth wheel to bring the loading on the front and drive axles to proper load distribution to pass the highway scale. To ensure an accurate gauge reading the operator will bleed air and reduce the air pressure by operation of the relief valve to energize the compressor to ensure equilibrium and offset any imbalance due to fifth wheel adjustment.

Should the trailer in another example be loaded with the greater weight to the rear, the reverse operation to that above may be carried out. The operator may sense this uneven loading by observing the air pressure needle after the compressor has been brought up to the high standard of 120 p.s.i. and noting a lower air pressure reading such as 84 p.s.i. The fifth wheel adjustment is operated to move the fifth wheel rearwardly until the air pressure is indicated at 85 p.s.i. The release of the relief valve 41 and energization of the compressor to the standard pressure is repeated to equilibrate the system. If need be the trailer adjustment 20 may also be operated to bring the loading on the front and drive axles and the trailer axles into the proper pressure reading of 85 p.s.i.

It will be understood that the operator may also keep a log to provide entries for loading at different positions of the trailer and the consequent fifth wheel adjustment positions on the rack as well as the trailer adjustment positions. These readings with the p.s.i. readings before and after adjustment with different loads and the actual scale readings will provide a history of the operation of the calibration gauge and system that will enable the operator to handle fresh loads that are of uneven distribution and effect proper loading on his rig.

While this invention has been particularly described in connection with the very important system for a tractor and trailer of a semitrailer, the calibration gauge and method of load analysis and distribution through an air bag pressure sensing may be employed on other vehicles employing an air bag suspension system. Thus, where box or straight trucks having a load carrying capacity are equipped with an air bag suspension system for the rear axles, the system of the invention employing the calibration gauge and method may be employed. Likewise, where a trailer of a semitrailer is equipped with an air bag suspension system for the trailer axles the invention may be employed in a similar manner. This may be effected even though the tractor has either a mechanical or air bag suspension system for the rear drive axles.

Various changes and modifications may be made within this invention as will be apparent to those skilled in the art. Such changes and modifications are within the scope and teaching of this invention as defined in the claims appended hereto.

What is claimed is:

1. A system for adjusting the load distribution on a vehicle provided with an air bag employed during operation of the vehicle to cushion the load upon an axle of the vehicle, said system comprising a calibration pressure gauge having an air pressure gauge in communication through an air line to sense air pressure in said air bag responsive to a load placed upon said vehicle by said load, said calibration pressure gauge having an air pressure indicating dial for reading air pressure thereon from an air pressure indicating needle, a load indicating dial for the axle provided with said air bag and a load indicating dial for another axle of said vehicle spaced on an opposite side of said load from said first named axle provided with said air bag.

2. The system of claim 1 in which the system is for adjusting the load distribution on the front and drive axles of a tractor and the rear axles of a trailer of a semitrailer provided with a fifth wheel for the tractor and an air bag on the tractor employed during operation of the semitrailer to cushion the load from the fifth wheel on the drive axles, said air bag being responsive to a load placed upon said fifth wheel by said trailer, said system comprising a fifth wheel adjustment position dial, a front axle load indicating dial and a drive axle load indicating dial.

3. The system of claim 2 in which an air relief valve is provided in the air line operable by an operator in a cab of the tractor.

4. The system of claim 2 in which the calibration air pressure gauge includes a separate moveable air pressure dial with air pressure markings which may be moved into radial registry with the fifth wheel adjustment position dial to indicate an air pressure at which the system is calibrated for a particular fifth wheel position.

5. The system of claim 2 in which the fifth wheel adjustment position dial, the front axle indicating dial and the drive axle load indicating dial are all moveable into registry with said air pressure needle to provide an indication of the load upon the front and drive axles and the fifth wheel when the system is calibrated.

6. The system of claim 5 in which the calibration air pressure gauge includes a separate moveable air pressure dial with air pressure markings and a manually moveable registration needle which may be moved into radial registry with the fifth wheel adjustment position dial to indicate an air pressure at which the system is calibrated for a particular fifth wheel position.

7. A method for utilization of a system for adjusting the load distribution on a vehicle provided with an air bag employed during operation of the vehicle to cushion the load upon an axle of the vehicle, said system comprising a calibration pressure gauge having an air pressure gauge in communication through an air line to sense air pressure in said air bag responsive to a load placed upon said vehicle by said load, said calibration pressure gauge having an air pressure indicating dial for reading air pressure thereon from an air pressure indicating needle, a load indicating dial for the axle provided with said air bag and a load indicating dial for another axle of said vehicle spaced on an opposite side of said load from said first named axle provided with said air bag, said method comprising calibrating the calibration pressure gauge with a vehicle having a known substantially evenly distributed, substantially maximum load by moving the vehicle to a level area, operating a compressor provided in the vehicle to an elevated standard pressure, adjusting the load to a position where the load upon the axles are properly distributed to the desired maximum loads, and adjusting the load indicating dial for the axle provided with the air bag and the load indicating dial for another axle of the vehicle into registry with the air pressure needle.

8. The method of claim 7 in which the method is for utilization of a system for adjusting the load distribution on the front and drive axles of a tractor and the rear axles of a trailer of a semitrailer provided with a fifth wheel for the tractor and an air bag on the tractor employed during operation to cushion the load from the fifth wheel on the drive axles, said air bag being responsive to a load placed upon said fifth wheel by said trailer, said system comprising a fifth wheel adjustment position dial, a front axle load indicating dial and a drive axle load indicating dial, said method comprising calibrating the calibration pressure gauge with a semitrailer having a known, substantially evenly distributed, substantially maximum load by moving the semitrailer to a level area, adjusting the trailer upon the fifth wheel to a longitudinal position where the load upon the front axle and the drive axle are properly distributed to the desired respective maximum loads, and adjusting the fifth wheel adjustment dial, the front axle dial and the drive axle dial into registry with said air pressure needle.

9. The method of claim 8 in which the system is provided with an air relief valve operable by an operator and said relief valve is operated to reduce the air pressure in the system to energize the compressor and bring the pressure to the standard pressure to equilibrate the system and readjusting the calibration gauge as necessary.

10. The method of claim 9 in which the calibration pressure gauge is provided with a separate moveable air pressure dial with air pressure markings and said last named dial is moved into radial registry with the air pressure needle and the fifth wheel adjustment dial when the system is calibrated.

11. The method of claim 10 in which after calibration an operator of the semitrailer upon taking on a new trailer load takes the semitrailer to a level area, operates the compressor to the elevated standard air pressure and observes the needle of the air pressure gauge and observes the indicated air pressure to determine whether the air pressure is proper for the calibrated air pressure for the fifth wheel adjustment position to indicate proper load distribution or above or below said calibrated air pressure to indicate uneven load distribution in the trailer.

12. The method of claim 11 in which if the air pressure observed by the operator after taking on a fresh load is higher than the calibrated air pressure to indicate an uneven load with a greater weight at the front of the trailer the operator moves the fifth wheel on the tractor forward until the observed air pressure approximates the calibrated air pressure.

13. The method of claim 11 in which if the air pressure observed by the operator after taking on a fresh load is lower than the calibrated air pressure to indicate an uneven load with a greater weight at the rear of the trailer the operator moves the fifth wheel on the tractor rearward until the observed air pressure approximates the calibrated air pressure.

14. The method of claim 11 in which if the air pressure observed by the operator after taking on a fresh load is higher than the calibrated air pressure to indicate an uneven load with a greater weight at the front of the trailer the operator moves the fifth wheel on the tractor forward until the observed air pressure approximates the calibrated air pressure and if the air pressure observed by the operator after taking on a fresh load is lower than the calibrated air pressure to indicate an uneven load at the rear of the trailer the operator moves the fifth wheel on the tractor rearward until the observed air pressure approximates the calibrated air pressure.

15. The method of claim 14 in which the system is provided with an air relief valve operable by an operator and said relief valve is operated to reduce the air pressure in the system to energize the compressor and bring the pressure to the standard pressure to equilibrate the system and readjusting the calibration gauge as necessary.

16. The method of claim 14 in which the trailer is provided with means for longitudinally adjusting the rear axles of the trailer and the operator adjusts said axles forwardly or rearwardly when the adjustment of the fifth wheel can not provide a proper load distribution over the drive axles to bring the air pressure gauge up to a calibrated pressure.

* * * * *